US011870183B2

(12) United States Patent
Shasho et al.

(10) Patent No.: US 11,870,183 B2
(45) Date of Patent: Jan. 9, 2024

(54) JOINT SYSTEM FOR ORBITAL AND EXTRA ORBITAL STRUCTURES

(71) Applicant: Honeybee Robotics, LLC, Longmont, CO (US)

(72) Inventors: Jeffrey I. Shasho, Brooklyn, NY (US); Jonah E. Saltzman, Brooklyn, NY (US)

(*) Notice: Subject to any disclaimer, the term of this patent is extended or adjusted under 35 U.S.C. 154(b) by 481 days.

(21) Appl. No.: 17/000,471

(22) Filed: Aug. 24, 2020

(65) Prior Publication Data

US 2021/0094708 A1   Apr. 1, 2021

Related U.S. Application Data

(60) Provisional application No. 62/908,916, filed on Oct. 1, 2019.

(51) Int. Cl.
| | | |
|---|---|---|
| *H01R 13/629* | (2006.01) | |
| *H01R 13/502* | (2006.01) | |
| *B64G 99/00* | (2009.01) | |

(52) U.S. Cl.
CPC ....... *H01R 13/62927* (2013.01); *B64G 99/00* (2022.08); *H01R 13/502* (2013.01)

(58) Field of Classification Search
CPC ............ H01R 13/62927; H01R 13/502; B64G 99/00; B64G 1/64; B64G 1/10; B64G 2001/1092; B64G 1/223
See application file for complete search history.

(56) References Cited

U.S. PATENT DOCUMENTS

| | | |
|---|---|---|
| 4,259,821 A | 4/1981 | Bush |
| 4,381,583 A | 5/1983 | Von Tiesenhausen |
| 4,518,277 A | 5/1985 | Bush et al. |
| 4,543,761 A | 10/1985 | Mockovciak |
| | (Continued) | |

FOREIGN PATENT DOCUMENTS

| | | |
|---|---|---|
| CN | 102167165 A | 8/2011 |
| FR | 2926484 A1 | 7/2009 |
| | (Continued) | |

OTHER PUBLICATIONS

International Search Report and Written Opinion for International Application No. PCT/US2020/049132; International Filing Date Sep. 3, 2020; Report dated Nov. 19, 2020 (pp. 1-10).

(Continued)

*Primary Examiner* — Michael C Zarroli
(74) *Attorney, Agent, or Firm* — McCarter & English, LLP; Dave S. Christensen

(57) ABSTRACT

A joint system for constructing orbital and extra-terrestrial structures includes a node receptacle having a node surface and a finger receiver projecting outwardly of the node surface, and a strut element including a support member, a finger element shiftably supported on the support member, a shell system shiftably supported on the support member and connected to the finger element, and an actuator mounted to the support member and operatively connected with the shell system. The actuator is operable to shift the finger element and the shell system into contact with the node receptacle. The finger element cooperates with the finger receiver to form a first load path and the shell system cooperating with the node surface to form a second load path.

21 Claims, 11 Drawing Sheets

(56) References Cited

U.S. PATENT DOCUMENTS

| | | | |
|---|---|---|---|
| 4,578,920 A | 4/1986 | Bush et al. | |
| 4,587,777 A | 5/1986 | Vasques et al. | |
| 4,667,451 A | 5/1987 | Onoda | |
| 4,745,725 A | 5/1988 | Onoda | |
| 4,763,459 A | 8/1988 | Wesselski | |
| 4,765,114 A | 8/1988 | Wesselski | |
| 4,771,585 A | 9/1988 | Onoda et al. | |
| 4,805,368 A | 2/1989 | Wesselski | |
| 4,819,399 A | 4/1989 | Onoda | |
| 4,932,807 A | 6/1990 | Rhodes | |
| 4,955,742 A | 9/1990 | Marks | |
| 4,998,842 A | 3/1991 | Sheridan | |
| 5,007,762 A | 4/1991 | Duran | |
| 5,186,567 A | 2/1993 | Evenson et al. | |
| 5,190,392 A | 3/1993 | Parma et al. | |
| 5,407,152 A | 4/1995 | Pelischek et al. | |
| 5,439,310 A * | 8/1995 | Evenson | B64G 1/641 403/321 |
| 6,441,801 B1 | 8/2002 | Knight et al. | |
| 7,059,094 B2 | 6/2006 | Yamawaki | |
| 2019/0165512 A1* | 5/2019 | Krize | H01R 13/04 |

FOREIGN PATENT DOCUMENTS

| | | |
|---|---|---|
| JP | 2004017957 A | 1/2004 |
| JP | 2005193723 A | 7/2005 |
| WO | 2016138426 A1 | 9/2016 |

OTHER PUBLICATIONS

Tibert "Deployable tensegrity structures for space applications." PhD diss., KTH, 2002. pp. 1-242.

Trudell et al. "Passively Damped Joints for Advanced Space Structures". McDonnell Douglas Astronautics Co Huntington Beach CA; Mar. 28, 1986. pp. 1-196.

Stohlman et al. "Shape accuracy of a joint-dominated deployable mast." In 51st AIAA/ASME/ASCE/AHS/ASC Structures, Structural Dynamics, and Materials Conference 18th AIAA/ASME/AHS Adaptive Structures Conference 12th, 2010. pp. 1-15.

Bandel et al. "Heavily loaded joints for assembling aerobrake support trusses." NASA Contractor Report (1990). pp. 1-116.

Miura "Triangles and quadrangles in space." In Symposium of the International Association for Shell and Spatial Structures (50th. 2009. Valencia). Evolution and Trends in Design, Analysis and Construction of Shell and Spatial Structures: Proceedings. Editorial Universitat Politècnica de València, 2009. pp. 27-38.

Jacquemin et al. "Development of assembly and joint concepts for erectable space structures." NASA Contractor Report 3131 (1980). pp. 1-205.

Heard Jr., et al. "A mobile work station concept for mechanically aided astronaut assembly of large space trusses." NASA Technical Paper 2108 (1983). pp. 1-44.

Bement et al. "EVA assembly of large space structure element." NASA Technical Paper 1872 (1981). pp. 1-37.

* cited by examiner

JOINT SYSTEM FOR ORBITAL AND EXTRA ORBITAL STRUCTURES

CROSS REFERENCE TO RELATED APPLICATION

This application claims the benefit of U.S. Provisional Application No. 62/908,916 filed Oct. 1, 2019, which is hereby incorporated by reference in its entirety.

STATEMENT OF GOVERNMENTAL INTEREST

This invention was made with Government support under contract NNX17CL09C awarded by NASA. The Government has certain rights in the invention.

INTRODUCTION

The subject disclosure relates to the art of truss systems and, more particularly, to a truss system employed to construct orbital and extra-terrestrial structures.

Building orbital and extra orbital structures presents a number of challenges. Orbital and extra orbital structures are typically formed from a plurality of interconnected members or struts that form a truss. The truss represents a low weight, resilient, and durable structure that may be readily adapted to suit a variety of applications. Other challenges include creating struts that possess desired stiffness, are robust and yet are also lightweight. That is, the struts should support loads in both tension and compression while meeting weight requirements. Accordingly, it is desirable to provide a robust low weight durable strut element for use in constructing orbital and extra orbital structures.

SUMMARY

Disclosed is a joint system for constructing orbital and extra-terrestrial structures including a node receptacle having a node surface and a finger receiver projecting outwardly of the node surface, and a strut element including a support member, a finger element shiftably supported on the support member, a shell system shiftably supported on the support member and connected to the finger element, and an actuator mounted to the support member and operatively connected with the shell system. The actuator is operable to shift the finger element and the shell system into contact with the node receptacle. The finger element cooperates with the finger receiver to form a first load path and the shell system cooperating with the node surface to form a second load path.

In addition to one or more of the features described above or below, or as an alternative, further embodiments could include wherein the first load path is isolated from the second load path.

In addition to one or more of the features described above or below, or as an alternative, further embodiments could include wherein the first load path defines a tensile load path and the second load path defines a compressive load path.

In addition to one or more of the features described above or below, or as an alternative, further embodiments could include wherein the node receptacle includes a first electrical connector and the support member includes a second electrical connector.

In addition to one or more of the features described above or below, or as an alternative, further embodiments could include wherein the shell system includes a shell front, a shell back, and a shell cap, the shell front being coupled to the shell back.

In addition to one or more of the features described above or below, or as an alternative, further embodiments could include wherein the shell front includes a load surface that selectively engages the node surface.

In addition to one or more of the features described above or below, or as an alternative, further embodiments could include wherein the load surface includes one of a projection and a recess and the node surface includes another of a projection and a recess, the one of the projection and the recess on the load surface cooperating with the another of the projection and the recess on the node surface to establish a selected alignment of the strut element and the node receptacle.

In addition to one or more of the features described above or below, or as an alternative, further embodiments could include wherein the shell back includes a first end, a second end, and an intermediate portion extending therebetween, the intermediate portion including a radially inwardly directed element that extends toward the support member defining a void.

In addition to one or more of the features described above or below, or as an alternative, further embodiments could include wherein the shell front is mounted to the first end and the finger element extends into the void.

In addition to one or more of the features described above or below, or as an alternative, further embodiments could include a spring arranged in the void between the radially inwardly directed element and the finger element.

In addition to one or more of the features described above or below, or as an alternative, further embodiments could include wherein the actuator is coupled to the shell system through the shell cap.

In addition to one or more of the features described above or below, or as an alternative, further embodiments could include a locking mechanism mounted to the actuator, the locking mechanism including a first locking member fixedly mounted to the actuator and a second locking member that is shiftably mounted to the actuator.

In addition to one or more of the features described above or below, or as an alternative, further embodiments could include wherein the second locking member is rotationally constrained with the actuator.

In addition to one or more of the features described above or below, or as an alternative, further embodiments could include wherein the shell front is mechanically connected to the node receptacle.

In addition to one or more of the features described above or below, or as an alternative, further embodiments could include wherein the support member includes an externally threaded surface and the actuator including an internally threaded surface that cooperates with the externally threaded surface.

In addition to one or more of the features described above or below, or as an alternative, further embodiments could include a strut member mechanically connected to the support member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
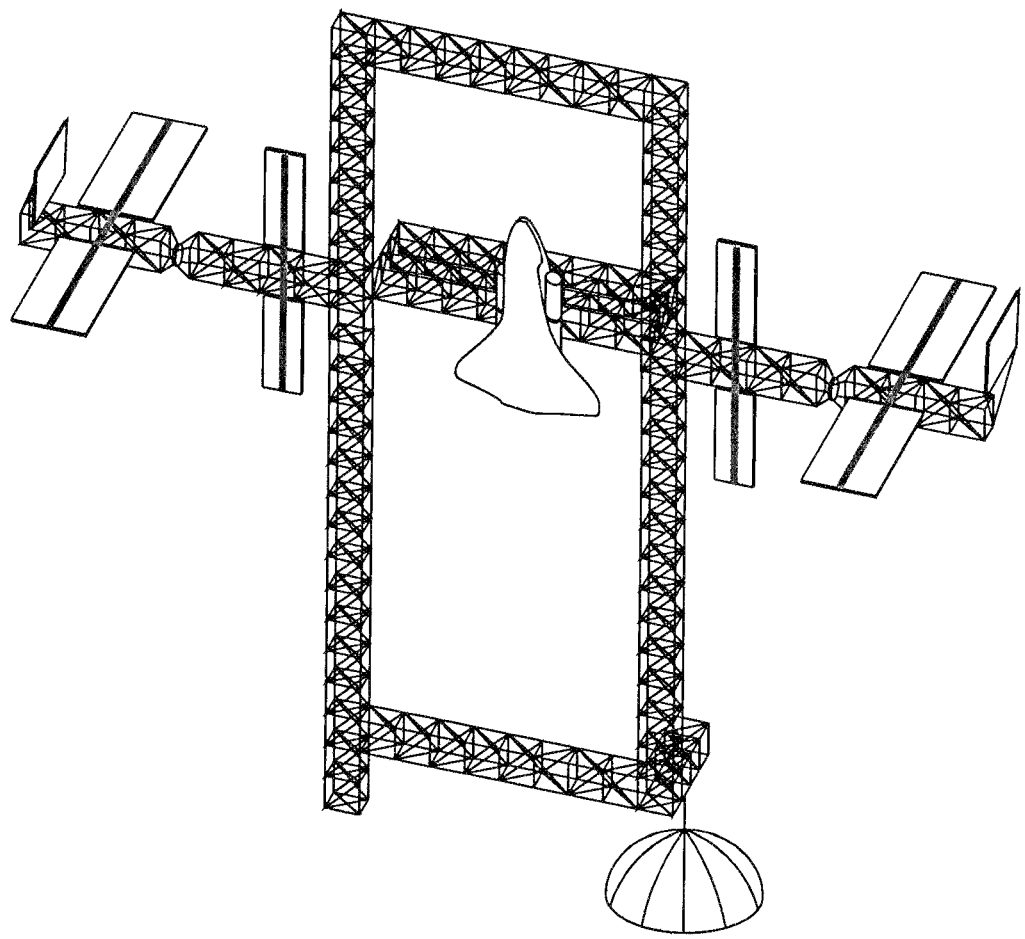
FIG. 1 depicts an orbital structure formed from a joint system, in accordance with an aspect of an exemplary embodiment.
Figure 2:
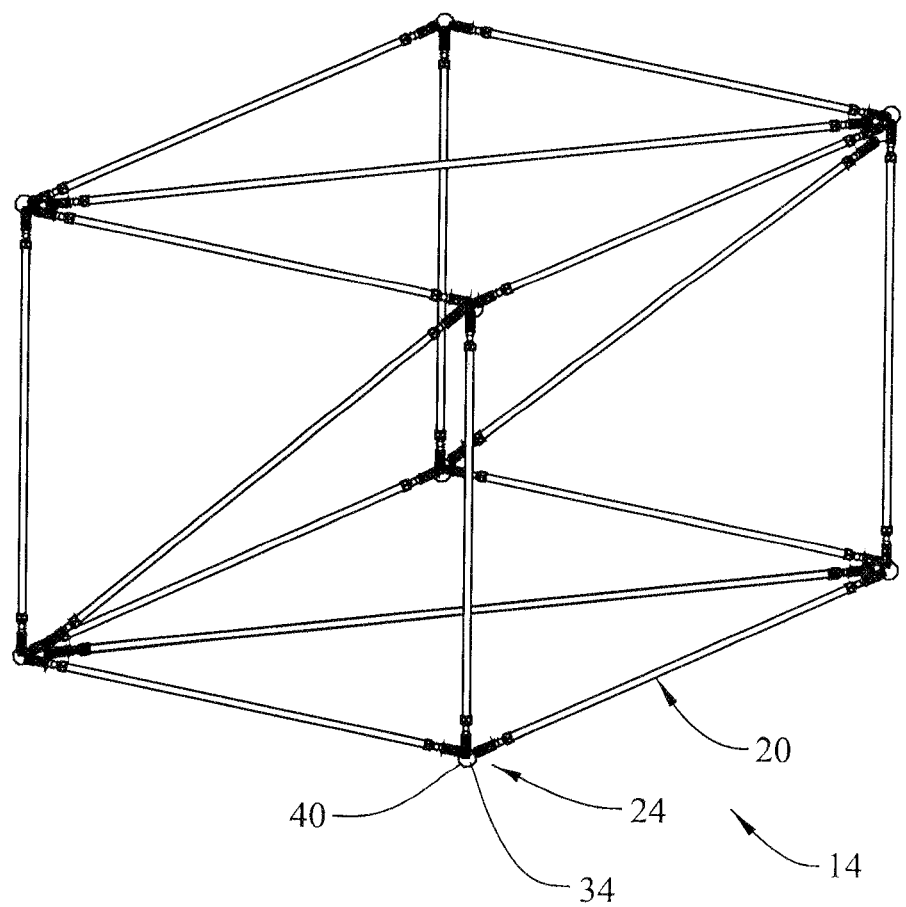
FIG. 2 depicts a connectible member of the orbital structure of FIG. 1 formed from a plurality of joint systems, in accordance with an exemplary aspect.
Figure 3:
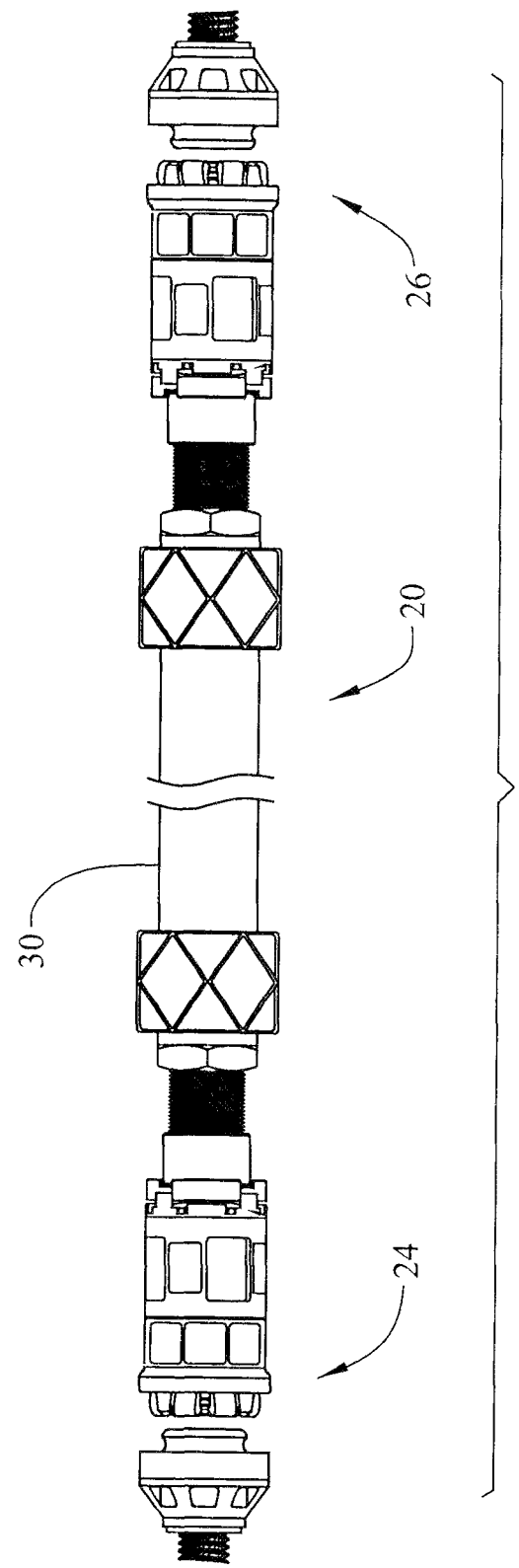
FIG. 3 depicts one of the plurality of joint systems of FIG. 2, in accordance with an exemplary aspect.

An orbital structure, constructed in accordance with an exemplary aspect, is indicated generally at 10 in FIG. 1. While shown as an orbital structure, the exemplary embodiments may also be employed to form extra-terrestrial structures or even terrestrial structures including undersea structures that may be built by submersible drones. Orbital structure 10 may be formed from a plurality of connectible members, one of which is shown at 14 in FIG. 2. Each connectible member 14 may take on various forms/shapes and is constructed by interconnecting multiple struts, one of which is indicated at 20 in FIG. 3.

In accordance with an exemplary aspect, each strut 20 includes a dual load path first joint system 24, a dual load path second joint system 26, and a connecting member 30 extending therebetween. Connecting member 30 may take the form of a tubular member and may be constructed from, for example, carbon fiber or other lightweight structural material or material suited to a particular environment. At this point it should be understood that the term "dual load path joint system" describes a joint having a first load path for supporting compressive forces and a second, distinct load path for supporting tensile forces.

Figure 4:
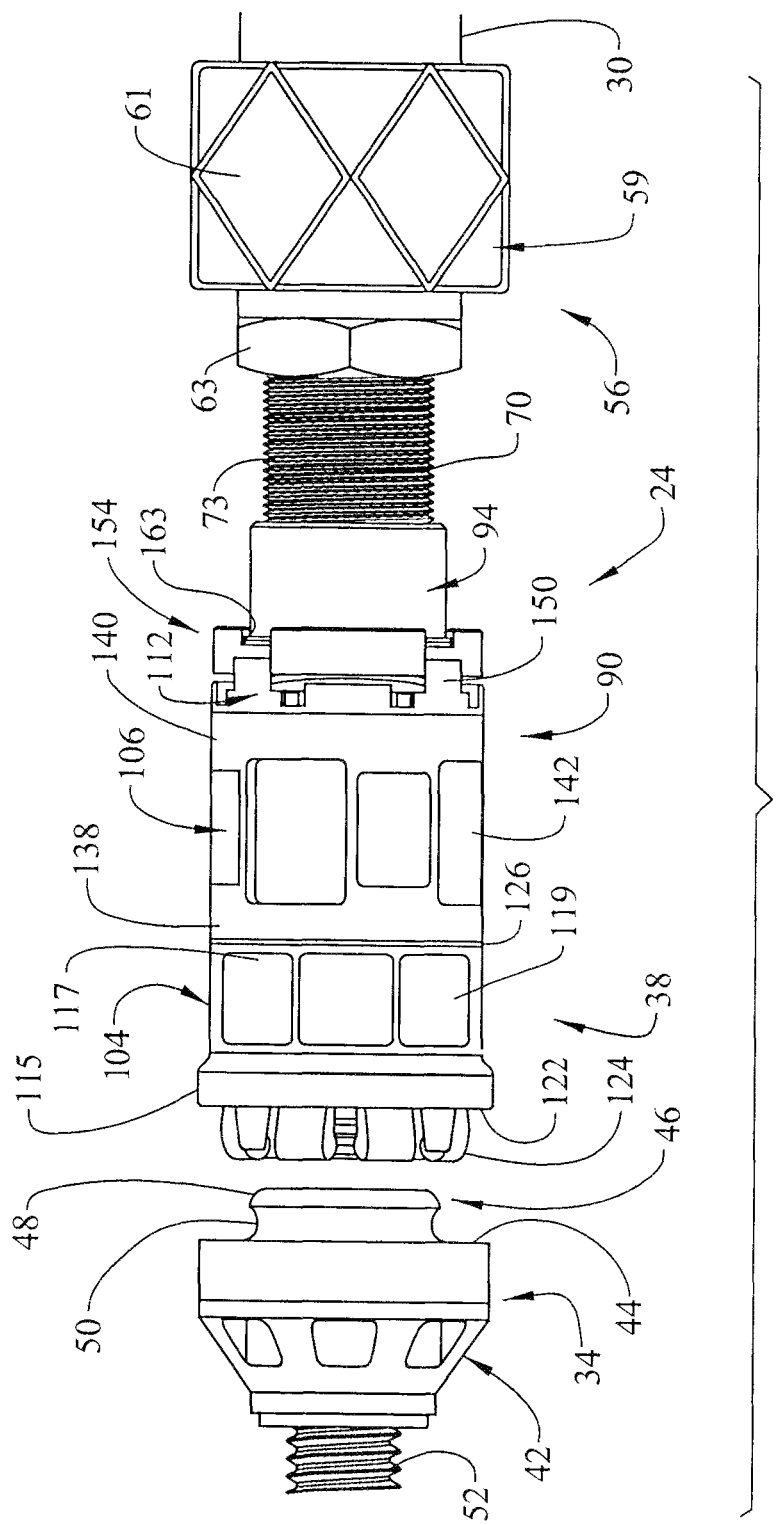
FIG. 4 depicts a node receptacle and a strut element of the joint system of FIG. 3, in accordance with an exemplary aspect.
Figure 5:
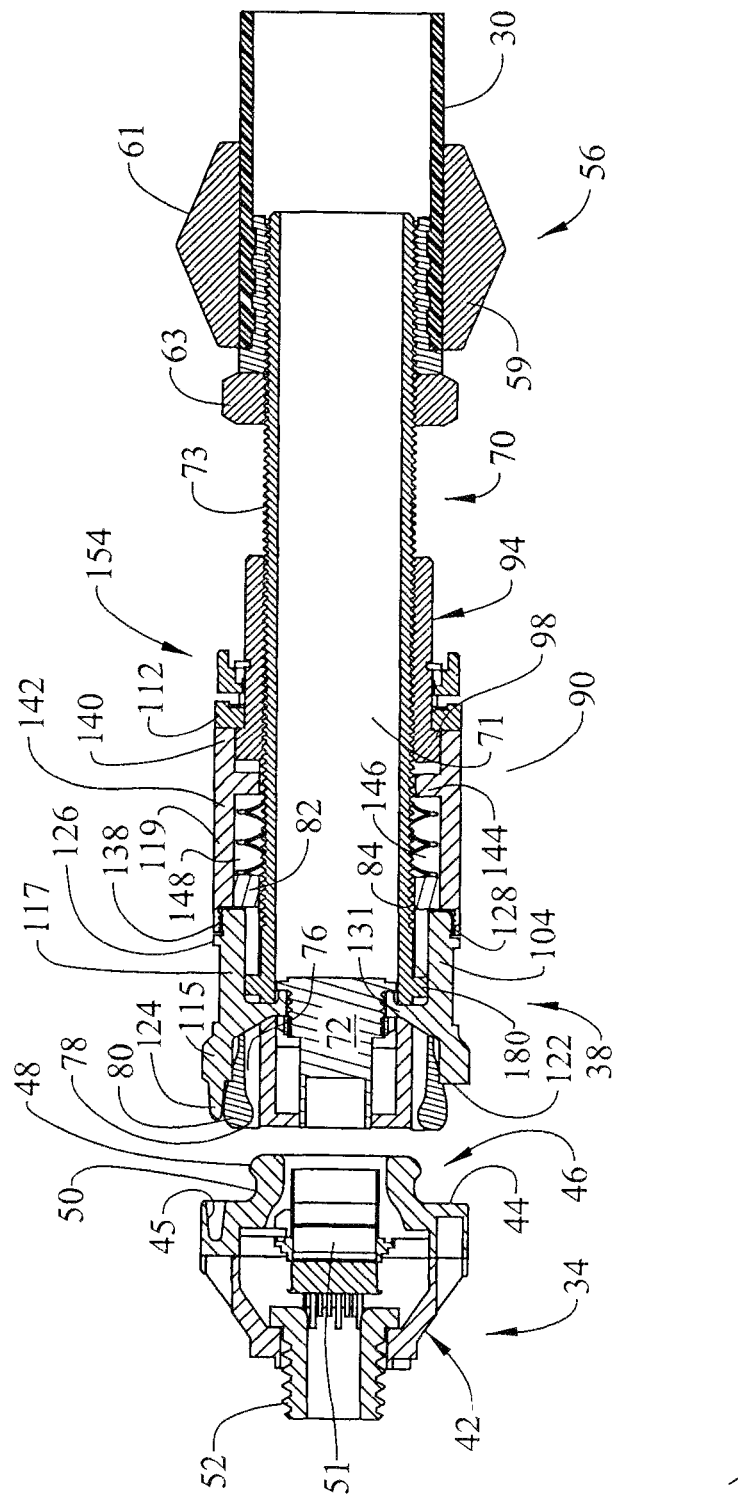
FIG. 5 depicts a cross-sectional view of the node receptacle and strut element of FIG. 4.
Figure 6:
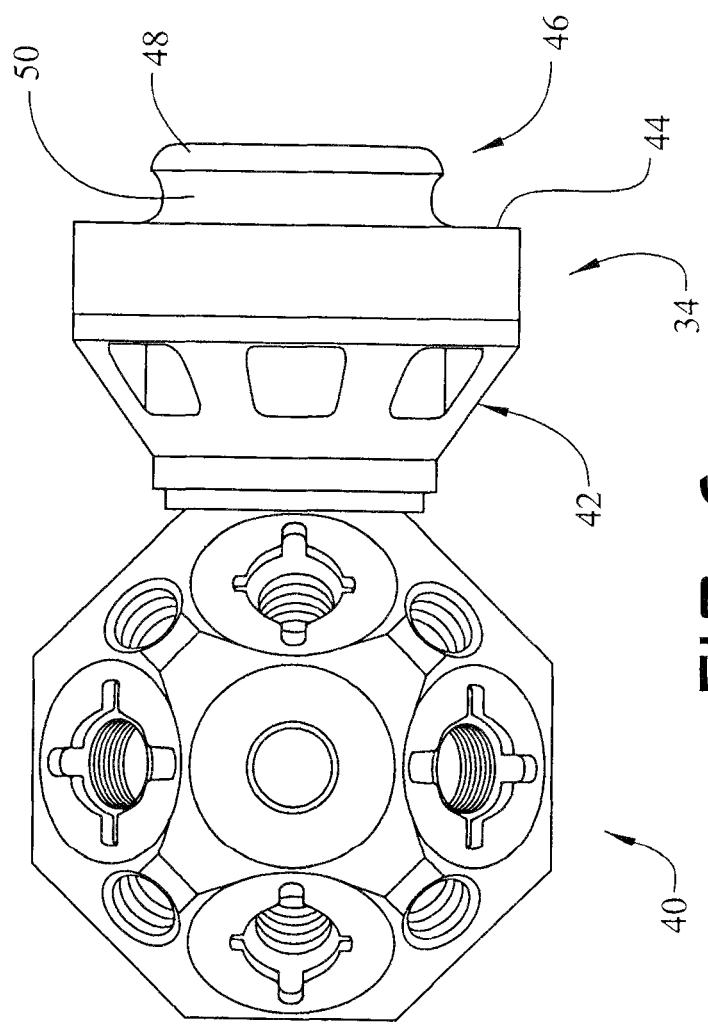
FIG. 6 depicts a node receptacle of FIG. 4 connected to a node ball or corner node, in accordance with an aspect of an exemplary embodiment.
Figure 7:
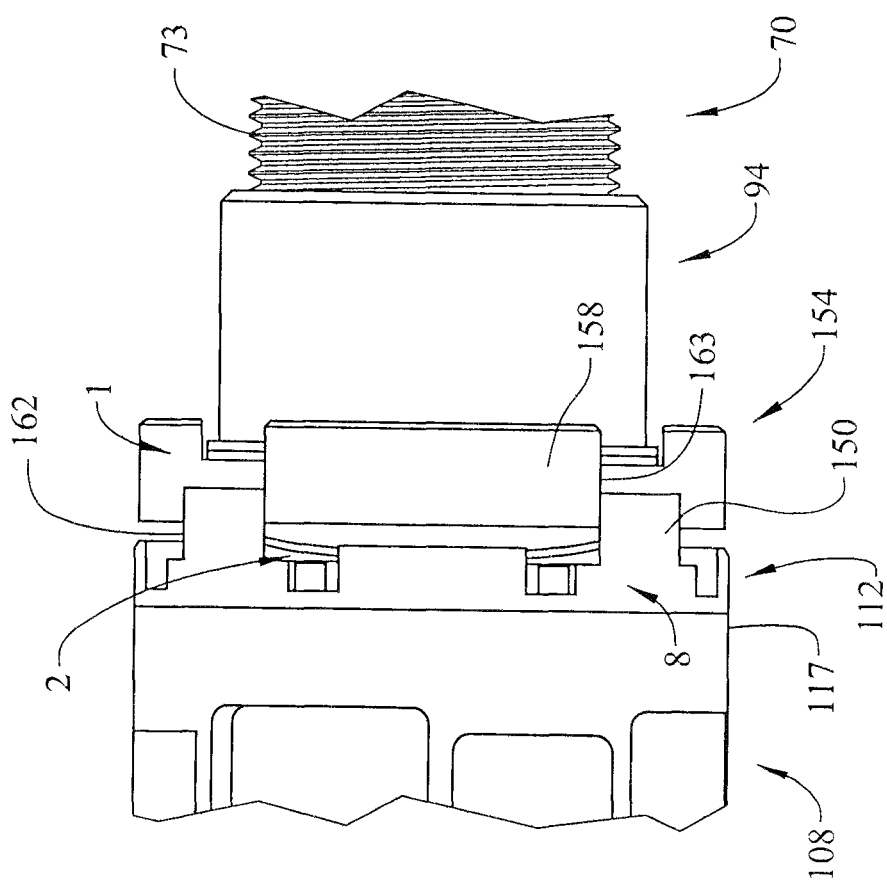
FIG. 7 depicts a locking system of the strut element of FIG. 4, in accordance with an exemplary embodiment.
Figure 8:
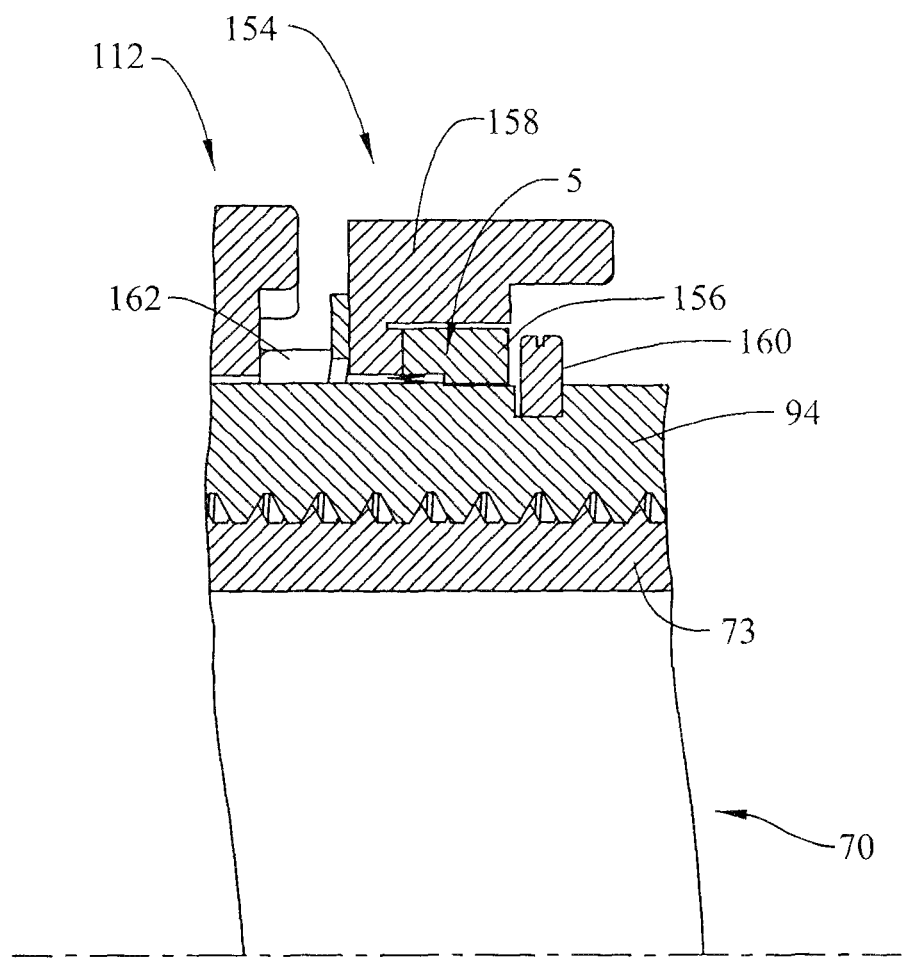
FIG. 8 is a partial cross-sectional view of the locking system of FIG. 6, in accordance with an exemplary aspect.
Figure 9:
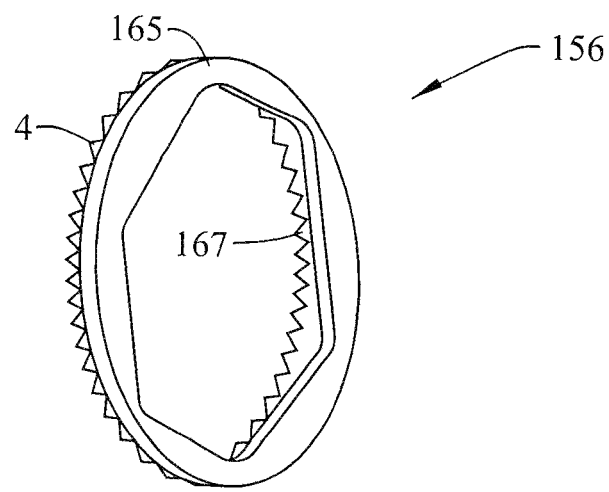
FIG. 9 depicts a first locking member of the locking system, in accordance with an exemplary aspect.

Reference will now follow to FIGS. 4-6 in describing joint system 24 with an understanding that joint system 26 includes similar structure. Joint system 24 includes a node receptacle 34 and a strut element 38. Node receptacle 34 may connect to a node ball or corner 40 shown in FIG. 6. Strut element 38 may define an axial extendable portion of dual load path joint system 24 that may connect to node receptacle 34. In accordance with an exemplary aspect, node receptacle 34 includes a node body 42 having a node surface 44 that may include one or more recesses such as indicated at 45. With this arrangement, strut 20 may be arranged between to two fixed node balls each supporting a corresponding node receptacle 34. Once in position, each strut element 38 may be extended axially outwardly and connected to corresponding node receptacles as will be discussed herein A finger receiver 46 extends outwardly from node surface 44. Finger receiver 46 includes an end portion 48 and an annular recess 50. Annular recess 50 is arranged in finger receiver 46 between end portion 48 and node surface 44. Finger receiver 46 may support a first connector 51 that may provide a communication path through strut 20. Node receptacle 34 may also include a threaded portion 52, which could take the form of a hollow bolt, which serves as an interface with node ball 40.

In accordance with an exemplary embodiment, connecting member 30 includes a terminal end 56 supporting an alignment member 59 having a number of alignment surfaces 61. Alignment member 59 may be used as an interface with a robotic arm (not shown) that may manipulate strut element 38 with node receptacle 34 as will be detailed herein. A jam nut 63 is arranged at terminal end 56 and is jammed into a threaded insert (not separately labeled) that interfaces with connecting member 30. Jam nut 63 also interfaces with strut element 38.

In accordance with an exemplary embodiment, strut element 38 includes a support member 70 having a hollow interior 71 that may support a second connector 72. Second connector 72 may interface with a conductor that passes through connecting member 30. Second connector 72 connects with first connector 51 in node receptacle as will be detailed herein. With first and second connectors may pass electrical signals, optical signals, and/or fluids and the like. Support member 70 also includes a threaded portion 73 that may interface with jam nut 63.

In further accordance with an exemplary aspect, strut element 38 includes a finger element 76 that selectively connects with finger receiver 46 in node receptacle 34. Finger element 76 includes a first end portion 78 having a radially inwardly directed portion 80 and a second end portion 82 that may rest upon threaded portion 73 of support member 70. Strut element 38 also includes a shell system 90 that selectively shifts finger element 76 into engagement with node receptacle 34. An actuator 94, which may take the form of a threaded fastener such as a nut (not separately labeled) includes an axial end 98 that acts upon shell system 90 to shift finger element(s) 76 into engagement with finger receiver 46. Actuator 94 may also be employed to disengage finger element(s) 76 from finger receiver 46.

In accordance with an exemplary aspect, shell system 90 includes a shell front 104, a shell back 106, and a shell cap 112. Shell front 104 includes a first end portion 115, a second end portion 117, and an intermediate zone 119. First end portion 115 includes a load surface 122 that may abut node surface 44 and a plurality of axially outwardly projecting alignment features, one of which is indicated at 124. Axially outwardly projecting alignment features 124 extend into corresponding ones of recesses 45 formed in node body 42 when load surface 122 engages with node surface 44.

Shell from 104 also includes a radially outwardly projecting lip 126 that is spaced from second end portion 117. A threaded zone 128 extends between radially outwardly projecting lip 126 and second end portion 117. Threaded zone 128 may engage with shell back 106. Further, shell front 104 includes a radially inwardly projecting interface 131 that extends from intermediate zone 119, through an opening (not separately labeled) in support member 70 and engages with second connector 72.

In still further accordance with an exemplary aspect, shell back 106 includes a first end 138, a second end 140, and an intermediate portion 142. A radially inwardly directed element 144 extends from intermediate portion 142 toward support member 70. A void 146 is defined between second end portion 82 of finger element 76 and radially inwardly directed element 144. A spring 148 is arranged in void 146. Spring 148 takes the form of a timing spring that acts upon finger element 76 as shell back 106 moves toward node receptacle 34.

Shell cap 112 abuts second end 140 of shell back 106 and constrains actuator 94 to shell system 90. Shell cap 112 includes a plurality of lugs, one of which is indicated at 150, which cooperate with a locking system 154. Locking system 154 selectively enables rotation actuator 94 on support member 70. Referring to FIGS. 6-9, locking system 154 includes a first or inner locking member 156 that is fixedly mounted to actuator 94 and interfaces with a second or outer locking member 158. A retainer 160 is mounted on actuator 94 and constrains axial movement of first locking member 156. A spring, shown in the form of a wave spring 162 is arrange between second locking member 158 and shell cap 112. Second locking member 158 includes a plurality of gaps 163 that are receptive of corresponding ones of lugs 150 on shell cap 112.

First locking member 156 includes an outer annular surface 165 including a first plurality of teeth 167 and second locking member 158 includes an inner annular surface 170 that includes a second plurality of teeth 172. Wave spring 162 biases second locking member 158 towards first locking member 156 such that the second plurality of teeth 172 engage with the first plurality of teeth 167. During a connection and/or disconnect operation, a force is applied to second locking member 158 causing wave spring 162 to compress allowing second plurality of teeth 172 to disengage from first plurality of teeth. At this point, actuator 94 may be rotated to shift shell system 90 along support member 70. In an embodiment, a robotic arm may both compress second locking member 158 and rotate actuator 94.

Figure 10:
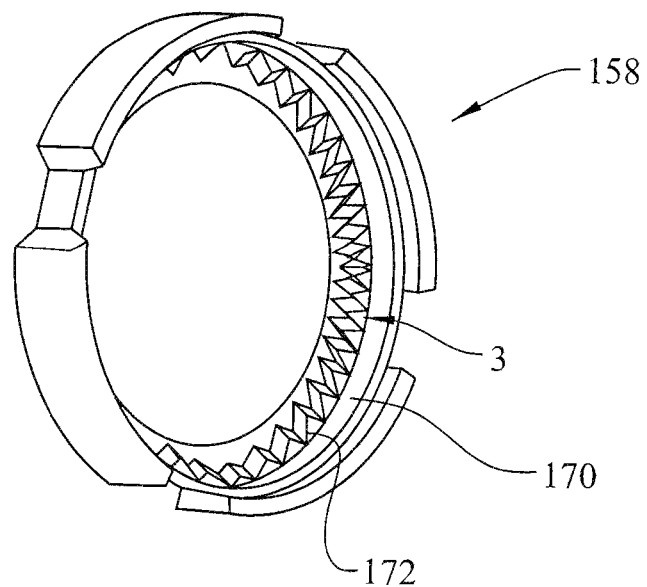
FIG. 10 depicts a second locking member of the locking system, in accordance with an exemplary aspect.
Figure 11:
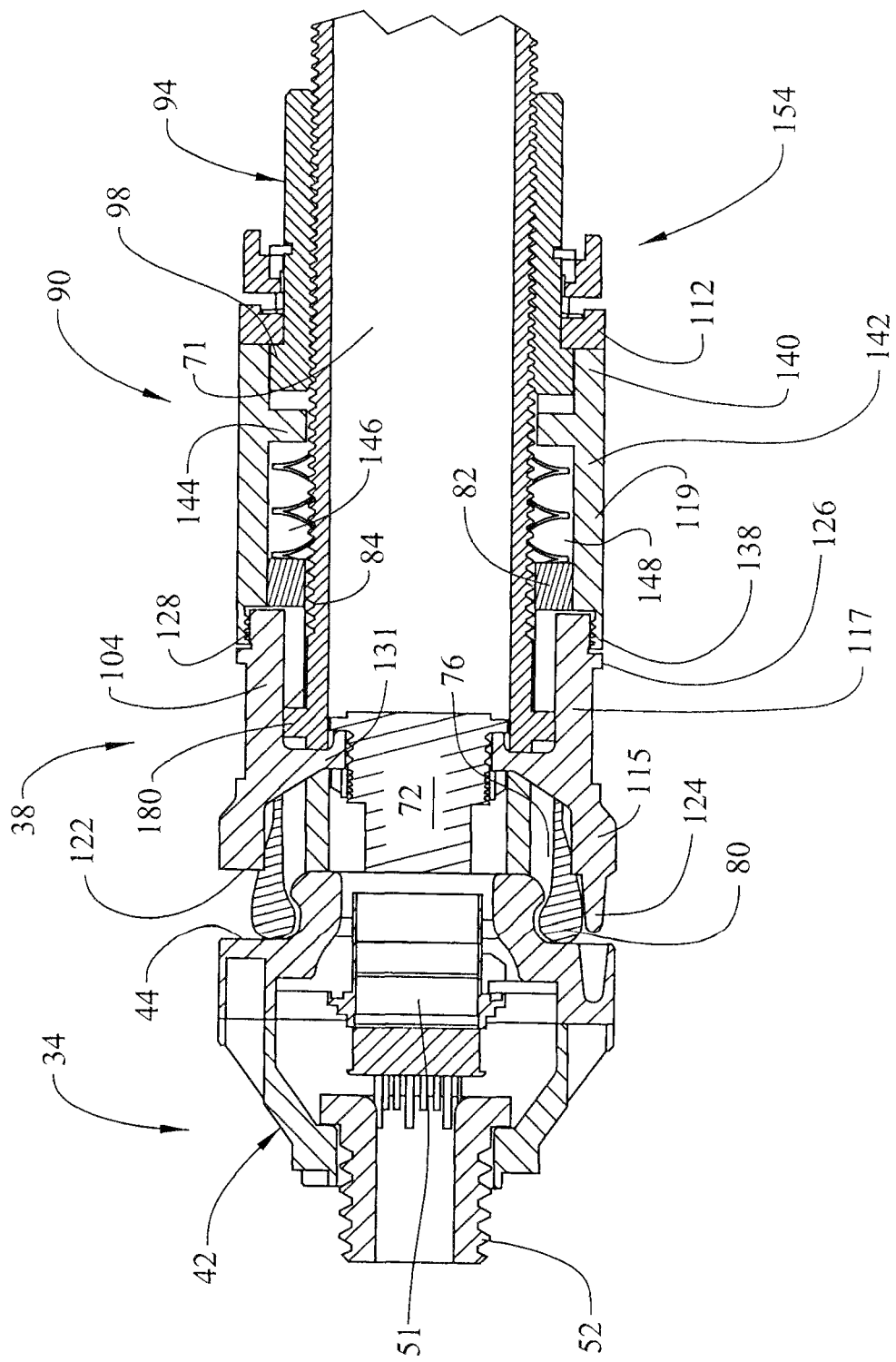
FIG. 11 depicts the strut element connecting to the node receptacle, in accordance with an exemplary aspect.

In accordance with an exemplary aspect, strut element 38 is aligned with node receptacle 34 as shown in FIG. 10. Locking system 154 is disengaged and actuator 94 is rotated. Actuator 94 acts upon shell cap 112 urging shell system 90 along support member 70. As shell system 90 traverses support member 70, shell back 106 acts on shell front 104 which moves over and causes finger element 76 to flex. One or more shaft nodules, such as indicated at 180 extending radially outwardly of support member 70 limit axial travel of finger elements 76. At the same time, radially inwardly directed element 144 acts upon timing spring 148 which, in turn acts on second end portion 82 of finger element 76. Timing spring 148 ensures that finger element 76 is in position before strut element 38 engages with node receptacle 34. At this point, while described as causing finger element 76 to flex, other mechanisms, such as pivoting about a pin, may also be employed. Further, it should be understood that finger elements 78 may serve to axially align node receptacle 34 and strut element 38.

Figure 12:
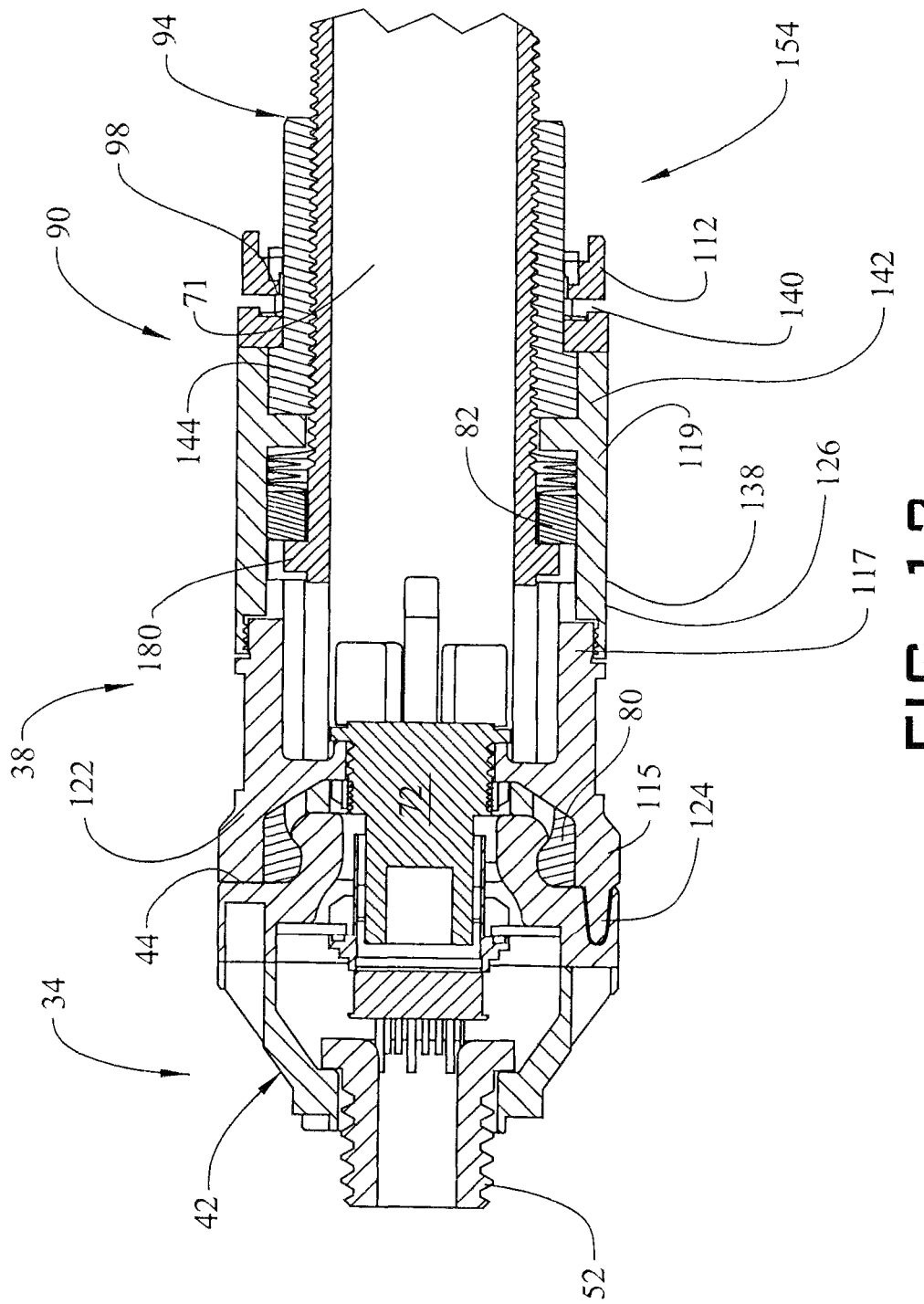
FIG. 12 depicts the strut element connected to the node receptacle, in accordance with an exemplary aspect.

Shell back 106 also drives second connector 72 toward first connector 51. Continued operation of actuator 94 causes radially inwardly directed portion 80 of finger element 76 to nest into annular recess 50 of finger receiver 46, and second connector portion 72 to engage with first connector portion 51 as shown in FIG. 12. Each finger element 78 may include a flat portion (not separately labeled) that engages with a corresponding flat (also not separately labeled) on annular recess 50. When engaged, finger element 78 is prevented from rotating relative to node receptacle 34. In addition, axially outwardly extending fingers 124 seat within recesses 45 allowing load surface 122 to engage with node surface 44. In this manner, a dual load path is formed between node receptacle 34 and strut element 38.

In accordance with an exemplary aspect, a first or compressive load path 200 is formed when load surface 122 engages with node surface 44. First load path 200 may pass through support member 70, into shell system 90 via actuator 94 and pass into node receptacle 34. A second, or tensile load path 210 is formed when finger element 76 engages with finger receiver 46 and retained by shell front 104. Second load path 210 passes through support member 70, into finger element 78 and on to node receptacle 34 via finger receiver 46.

In this manner, components in each load path may be designed to support anticipated loads. Thus, a component that will be more in tension than in compression may not need as robust a compressive load path. Conversely, a component that will be under greater compressive forces than tensile forces may not require as robust a tensile load path. Therefore, the joint system may be designed/adapted to a given configuration and, at the same time, be able to maintain a smaller form factor over a device having a single load path. In addition, to the use of multiple load paths, the system is designed to be constructed using manual labor or through the use of remotely controlled robots/drones equipped to manipulate the various features, actuators, and fasteners of the exemplary embodiments.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A joint system for constructing orbital and extraterrestrial structures comprising:
   a node receptacle including a node surface and a finger receiver projecting outwardly of the node surface, wherein the node receptacle includes a first electrical connector; and a strut element including a support member, the support member including a second electrical connector, a finger element shiftably supported on the support member, a shell system shiftably supported on the support member and connected to the finger element, and an actuator mounted to the support member and operatively connected with the shell system, the actuator being operable to shift the finger element and the shell system into contact with the node receptacle, the finger element cooperating with the finger receiver to form a first load path and the shell system cooperating with the node surface to form a second load path, wherein the shell system includes a shell front, a shell back, and a shell cap, the shell front being coupled to the shell back, wherein the shell back includes a first end, a second end, and an intermediate portion extending therebetween, the intermediate portion including a radially inwardly directed element that extends toward the support member defining a void.

2. The joint system according to claim 1, wherein the first load path is isolated from the second load path.

3. The joint system according to claim 1, wherein the first load path defines a tensile load path and the second load path defines a compressive load path.

4. The joint system according to claim 1, wherein the shell front includes a load surface that selectively engages the node surface.

5. The joint system according to claim 4, wherein the load surface includes one of a projection and a recess and the node surface includes another of a projection and a recess, the one of the projection and the recess on the load surface cooperating with the another of the projection and the recess on the node surface to establish a selected alignment of the strut element and the node receptacle.

6. The joint system according to claim 1, wherein the shell front is mounted to the first end and the finger element extends into the void.

7. The joint system according to claim 6, further comprising: a spring arranged in the void between the radially inwardly directed element and the finger element.

8. The joint system according to claim 1, wherein the actuator is coupled to the shell system through the shell cap.

9. The joint system according to claim 1, wherein the shell front is mechanically connected to the node receptacle.

10. The joint system according to claim 1, wherein the support member includes an externally threaded surface and the actuator including an internally threaded surface that cooperates with the externally threaded surface.

11. The joint system according to claim 1, further comprising: a strut member mechanically connected to the support member.

12. A joint system for constructing orbital and extraterrestrial structures comprising:

a node receptacle including a node surface and a finger receiver projecting outwardly of the node surface, wherein the node receptacle includes a first electrical connector;

a strut element including a support member, the support member including a second electrical connector, a finger element shiftably supported on the support member, a shell system shiftably supported on the support member and connected to the finger element, and an actuator mounted to the support member and operatively connected with the shell system, the actuator being operable to shift the finger element and the shell system into contact with the node receptacle, the finger element cooperating with the finger receiver to form a first load path and the shell system cooperating with the node surface to form a second load path, wherein the shell system includes a shell front, a shell back, and a shell cap, the shell front being coupled to the shell back; and a locking mechanism mounted to the actuator, the locking mechanism including a first locking member fixedly mounted to the actuator and a second locking member that is shiftably mounted to the actuator.

13. The joint system according to claim 12, wherein the second locking member is rotationally constrained with the actuator.

14. The joint system according to claim 12, wherein the first load path is isolated from the second load path.

15. The joint system according to claim 12, wherein the first load path defines a tensile load path and the second load path defines a compressive load path.

16. The joint system according to claim 12, wherein the shell front includes a load surface that selectively engages the node surface.

17. The joint system according to claim 16, wherein the load surface includes one of a projection and a recess and the node surface includes another of a projection and a recess, the one of the projection and the recess on the load surface cooperating with the another of the projection and the recess on the node surface to establish a selected alignment of the strut element and the node receptacle.

18. The joint system according to claim 12, wherein the actuator is coupled to the shell system through the shell cap.

19. The joint system according to claim 12, wherein the shell front is mechanically connected to the node receptacle.

20. The joint system according to claim 12, wherein the support member includes an externally threaded surface and the actuator including an internally threaded surface that cooperates with the externally threaded surface.

21. The joint system according to claim 12, further comprising: a strut member mechanically connected to the support member.

* * * * *